Patented Nov. 13, 1951

2,574,515

UNITED STATES PATENT OFFICE 2,574,515

ORGANIC COMPOUNDS CONTAINING PHOSPHORUS AND BROMINE

George E. Walter, Baltimore, and Irwin Hornstein, East Riverdale, Md., assignors to The Glenn L. Martin Company, Middle River, Md., a corporation of Maryland No Drawing. Application November 26, 1948, Serial No. 62,233

8 Claims. (Cl. 260—461)

In the co-pending application of George E. Walter and Irwin Hornstein, Serial No. 62,232, filed November 26, 1948, organic polymers containing phosphorus and halogen are described, which are suitable for various uses, particularly for rendering flameproof any inflammable material, such as textiles of all kinds, including cotton and rayon, for preparing flameproof films, plasticizers, for insecticides, and several other applications. That method consists substantially in preparing halogenated poly-alkene phosphates and halogenated poly-dialkene phosphates, for instance poly-bromo-triallyl phosphates and poly-bromo-dialkene amido phosphates. In particular, effective flameproofers can be prepared which, due to their polymerization, supply their own resinous binder so that no foreign binder is needed. We found that bromine is many times more effective than chlorine.

We have now found that the superiority of bromine over chlorine which we found in the polymers also comes distinctively into appearance when the monomers themselves are brominated, whether or not all double bonds, or only part of them, are brominated. In practically all applications and especially in the flameproofing field that effect has been established. Though the brominated monomers do not give as permanent flameproofing finishes as the polymers, they impart a very desirable "feel" to the textile, and in cases where high permanence toward laundering and dry-cleaning is not relevant, the monomers can be applied successfully instead of the polymers.

In the flameproofing field, the difference between the brominated and chlorinated compounds is a fundamental one rather than one of degree. While the chlorinated compounds act merely as flame retardent agents, the brominated compounds are excellent flameproofers, particularly when there are two bromine atoms in the molecule on adjacent carbon atoms. Furthermore, leaving at least one double bond of the original unsaturation of the monomer intact seems to help in making the compounds adhere to a somewhat higher degree on the fabric.

Thus, one object of this invention is to prepare brominated derivatives of alkene phosphates by addition of bromine to an alkene phosphate.

Another object is to prepare brominated alkene phosphate derivatives having at least two bromine atoms in the molecule on neighboring carbon atoms.

Another object is to prepare an alkene phosphate having at least two bromine atoms, and at least one double bond in the molecule.

A further object is the preparation of brominated dialkene phosphate derivatives.

Still another object of the present invention is to prepare halogenated, particularly brominated, derivatives of dialkene amido phosphates.

This application is a continuation-in-part of application Serial No. 761,147, George E. Walter and Irwin Hornstein, filed July 15, 1947, now abandoned.

It is interesting to note that the brominated alkene phosphates are effective flameproofers for both cellulose and cellulose acetate type textiles, while corresponding chlorinated compounds acted as retardants only, and were particularly of no great value on cotton.

Brominated alkene phosphates have been found very useful as plasticizers in several resin and like materials where the flameproofing effect is an additional advantage. Thus flameproof films of vinyl type resins and cellulose acetate can be produced by plasticizing those materials with brominated tri-allyl phosphate. Triallyl phosphate itself can be used as a binder for the brominated material if the latter is introduced in the non-brominated monomers with subsequent polymerization. In the co-pending application of George E. Walter, Clarence A. Sheld and Irwin Hornstein, Serial No. 62,235, filed November 26, 1948, a process is described of incorporating hexa-bromotriallyl phosphate in triallyl phosphate, impregnating textile with a solution of the mixture and polymerizing triallyl phosphate in the presence of a peroxide catalyst and in a nitrogen atmosphere, resulting in a flameproof textile finish.

The following examples are specific illustrations of methods of preparing the compounds of our invention.

Example I

Triallyl phosphate completely brominated in solution:

218 parts of triallyl phosphate are dissolved in 654 parts of benzene. 480 parts of bromine in 480 parts of benzene are slowly added at approximately 25° C. with stirring. When the addition is completed, anhydrous ammonia is passed through to remove excess bromine and to neutralize the solution. Precipitated salts are filtered off. The solution is further diluted in order to give a concentration that will provide the desired pick-up on the cloth, i. e., 10–30%, dependent on the type of textile.

Cotton and acetate rayon impregnated with the solution are rendered flameproof.

Example II

Triallyl phosphate partially brominated in solution:

218 parts of triallyl phosphate are dissolved in 2180 parts of benzene; 160 parts of bromine in 1600 parts of benzene are slowly added, with vigorous stirring and at room temperature. When the addition is completed, anhydrous ammonia is passed through to neutralize any acid products. If any salts are precipitated they are filtered off.

The solution is concentrated to the desired degree.

Textiles impregnated with this solution are rendered flameproof, and show some permanence in dry-cleaning.

The amount of bromine added is equivalent to the formation of a dibromo triallyl phosphate. Although the bromine content is lower than above the total pick-up for flameproofness does not materially change.

Example III

Triallyl phosphate brominated in emulsion:

An emulsion of 50 parts of triallyl phosphate in a solution of 5 parts of polyvinyl alcohol and 100 parts of water is prepared by the slow addition of the triallyl phosphate to the polyvinyl alcohol solution with vigorous stirring. 5 parts of calcium carbonate are added to keep the pH constant during bromination. The emulsion may be stabilized by running through a colloid mill.

110 parts of bromine in 50 parts of benzene are added slowly with good agitation at 20° C. The emulsion is ready for use and may be directly applied to the textile.

Example IV

Triallyl phosphate partially brominated in emulsion:

50 parts of triallyl phosphate are emulsified with 5 parts of polyvinyl alcohol and 200 parts of water.

37 parts of bromine in 100 parts of benzene are dropped in slowly with vigorous agitation at a temperature of 20° C. This amount of bromine is equivalent to the formation of a dibromo-triallyl phosphate.

Example V

Incorporation of brominated triallyl phosphate in a Vinylite binder:

To 218 parts of triallyl phosphate dissolved in 218 parts of benzene are added 480 parts of bromine in 480 parts of benzene. The addition is made at room temperature. When the reaction is completed, anhydrous ammonia is passed through to remove excess bromine and acid materials. If salts separate they are filtered off. The benzene is removed under vacuum. The remaining thick viscous oil is a hexabromo triallyl phosphate.

Thirty parts of this material are dissolved in 400 parts of methyl ethyl ketone to which are added 70 parts of Vinylite, (such as a vinyl chloride-vinyl acetate copolymer containing about 80 per cent vinyl chloride).

The textile to be flameproof is impregnated with this solution and dried. The resulting finish is flameproof.

Cotton so treated has resisted boiling in 1 per cent soap solution for at least 30 minutes. The finish is also dry-cleaned proof.

Example VI

Incorporation of brominated triallyl phosphate as a flameproofing plasticizer in a Vinylite film:

21.8 parts of hexabromo triallyl phosphate prepared by completely brominating triallyl phosphate are dissolved in a solution of 73 parts of Vinylite (such as a vinyl chloride-vinyl acetate copolymer containing about 80 per cent vinyl chloride) in 365 parts of methyl ethyl ketone.

Films prepared from this solution by evaporating the solvent are transparent, colorless, tough and flameproof, the hexabromo triallyl phosphate acting both as a plasticizer and flameproofer.

This method of plasticizing and flameproofing at the same time may be applied to other vinyl type materials and to organic cellulose derivatives.

Example VII

The preparation of tetra bromo diallyl ammonium phosphate and its use as a flameproofer:

46 parts of sodium metal are dissolved in 232 parts of allyl alcohol and 232 parts of toluene. At 0° C. 153.5 parts of phosphorous oxychloride are slowly added with stirring. When the addition is completed the temperature is kept at 10° C. for an additional hour. A good yield of diallyl phosphoric acid is obtained. Sodium chloride is filtered off and the solution concentrated. Anhydrous ammonia is passed in and the diallyl ammonium phosphate precipitates. 178 parts of the ammonia salt are dissolved in water and 320 parts of bromine are added with vigorous stirring at 10° C. to form the tetra bromo diallyl ammonium phosphate. This compound is useful wherever water solubility is desired. It is an excellent flameproofing agent and imparts a fine "hand" to treated textiles.

Aside from tri-alkene phosphates, dialkene phosphates, in particular the dialkene amido phosphates, can be brominated to give useful compounds suitable for use, as example, as flameproofers. The preparation of the dialkene amido phosphates is described in the co-pending application of George E. Walter, Irwin Hornstein and George M. Steinberg, Serial No. 62,234, filed November 26, 1948. These compounds on bromination give highly effective flameproofing compounds which are useful where water soluble types can be applied. Compounds of this type are those included within the following formula:

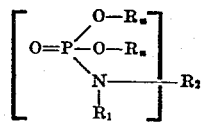

where $R_u$ represents an unsaturated aliphatic radical having from 3 to 5 carbon atoms and selected from the class consisting of alkenyl and alkynyl radicals; $R_1$ is selected from the class consisting of hydrogen, an alkyl radical having from 1 to 3 carbon atoms, an hydroxyalkyl radical having from 1 to 3 carbon atoms, and an unsaturated aliphatic radical having from 3 to 5 carbon atoms and selected from the class consisting of alkenyl and alkynyl radicals; and $R_2$ is selected from the class consisting of hydrogen, an unsaturated aliphatic radical having from 3 to 5 carbon atoms and selected from the class consisting of alkenyl and alkynyl radicals, and X, where X represents

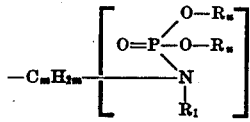

in which $m$ is a small whole integer and $R_1$ and $R_{11}$ have the same meanings as before.

The following examples illustrate the preparation of these compounds:

Example VIII

Tetra bromo diallyl phosphonamide:

To 177 parts of diallyl phosphonamide dissolved in 500 parts of a mixture of 70 per cent carbon tetrachloride-30 per cent isopropanol are added dropwise and at room temperature 320 parts of elementary bromine. When the addition is complete, the solution is neutralized by adding a few drops of concentrated ammonium hydroxide. Cellulose acetate and cotton fabrics impregnated with this solution are when first dried somewhat tacky but further heating improves the "hand" very appreciably.

The dry pick-up necessary to flameproof cotton is no more than 10-12 per cent. Cellulose acetate requires 20-25 per cent. Textiles so treated can withstand leaching in cold water overnight.

Example IX

Tetra bromo N-methylol diallyl phosphonamide:

To 207 parts of N-methylol diallyl phosphonamide dissolved in 500 parts of a mixture of 70 per cent ethylene dichloride-30 per cent isopropanol are added dropwise at room temperature 320 parts of elementary bromine. When the addition is complete the solution is allowed to stand for 15 minutes and then neutralized by adding a few drops of concentrated ammonium hydroxide.

Cellulose acetate and cotton fabrics impregnated with this solution when first dried at 100° C. for 2-3 minutes are quite tacky. However, further heating for 15-20 minutes at 120° C. changes the "hand" completely. The fabrics so treated have a finish difficult to distinguish from the original "hand."

Cotton twill can be flameproofed with as low as 10 per cent dry pick-up. Twill with a 20 per cent pick-up can be boiled in water for at least two hours with no loss in flameproofness, and can withstand several severe launderings (in neutral soap) and dry-cleanings.

Cellulose acetate with a 25-28 per cent pick-up is rendered flameproof. In addition, "dripping" on burning which is characteristic of cellulose acetate fabrics is eliminated. It should be noted that almost all of the compounds described in this application will do away with "dripping."

The flameproof finish is not removed even by successive dry-cleanings.

Example X

Octabromo N-N' methylene bis diallyl phosphonamide:

To 366 parts of N-N' methylene bis diallyl phosphonamide dissolved in 1000 parts of mixture of 70 per cent ethylene dichloride-30 per cent isopropanol are added dropwise and at room temperature 640 parts of elementary bromine. When the addition is complete a few drops of concentrated ammonium hydroxide are added to neutralize the solution.

The solution is diluted to the desired concentration by adding as much of the 70-30 ethylene dichloride-isopropanol mixture as may be necessary.

Cellulose acetate and cotton fabrics impregnated with this solution when first dried at 100° C. for 2-3 minutes are quite tacky. Further heating at 120° C. for 15-20 minutes improves the "hand" materially. This material imparts a somewhat stiffer "hand" to Celanese (cellulose acetate) than the tetra bromo N-methylol diallyl phosphonamide. In addition, it is, however, dry-clean resistant. Cellulose acetate fabrics with a 25-30 per cent pick-up are completely flameproof and can withstand several dry-cleanings.

Cotton fabrics are flameproof with a 10-15 per cent pick-up and can resist several launderings in neutral soap solutions.

Example XI

Hexabromo N-allyl diallyl phosphonamide:

To 217 parts of N-allyl diallyl phosphonamide dissolved in 500 parts of a mixture of 70 per cent tetrachloride and 30 per cent isopropanol are added slowly at room temperature 480 parts of elementary bromine. When the addition is complete the solution is neutralized by adding a few drops of concentrated ammonium hydroxide.

Cellulose acetate and cotton fabrics impregnated with appropriately diluted solution are effectively flameproofed and can withstand some laundering, dry-cleaning and leaching.

Example XII

Octabromo N-diallyl diallyl phosphonamide:

To 257 parts of N-diallyl diallyl phosphonamide in 1000 ml. of a 70 per cent carbon tetrachloride-30 per cent isopropanol solution are added slowly and at room temperature 640 parts of bromine. When addition is completed the solution is neutralized by the addition of a few drops of concentrated ammonium hydroxide.

When appropriately diluted, cellulose acetate and cotton fabrics can be effectively flameproofed with pick-ups of 25 per cent and 10 per cent, respectively.

These brominated monomers are unexcelled flameproofers in cases where the need for permanency is not of the utmost importance. Some of the derivatives, such as the methylol and methylene derivatives of completely brominated diallyl phosphonamides, have a very marked affinity for cellulose materials. We think that perhaps some reaction may take place between the free hydroxyls in the cellulose molecules and these compounds.

By similar procedures, partially or completely brominated derivatives of N-N' ethylene bis diallyl amido phosphate and dipropargyl phosphonamide can be prepared.

The preceding examples are in no way restrictive of the invention and its application and are intended to illustrate only its use in the flameproofing field.

Apart from flameproofing, the compounds described are suitable for use in the preparation of germicides, fungicides, insecticides, mildew-proofing agents, lubricating oil modifiers, and corrosion inhibitors.

It is to be understood that certain changes, alterations, modifications and substitutions can be made without departing from the spirit and scope of the appended claims.

We claim as our invention:

1. A compound obtained by brominating an unsaturated aliphatic phosphonamide derivative having the formula

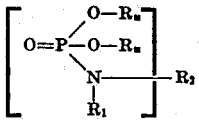

where $R_u$ represents an unsaturated aliphatic radical having from 3 to 5 carbon atoms and selected from the class consisting of alkenyl and alkynyl radicals; $R_1$ is selected from the class consisting of hydrogen, an alkyl radical having from 1 to 3 carbon atoms, an hydroxyalkyl radical having from 1 to 3 carbon atoms, and an unsaturated aliphatic radical having from 3 to 5 carbon atoms and selected from the class consisting of alkenyl and alkynyl radicals; and $R_2$ is selected from the class consisting of hydrogen, an unsaturated aliphatic radical having from 3 to 5 carbon atoms and selected from the class consisting of alkenyl and alkynyl radicals, and X, where X represents

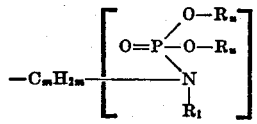

and in which $m$ is a small whole integer and $R_1$ and $R_u$ have the same meanings as before.

2. A brominated di-alkene phosphonamide having at least two bromine atoms per molecule.

3. Tetrabromo-diallyl phosphonamide.

4. A brominated diallyl phosphonamide having at least two bromine atoms per molecule.

5. A brominated N-methylol diallyl phosphonamide having at least two bromine atoms per molecule.

6. A brominated N-allyl-diallyl phosphonamide having at least two bromine atoms per molecule.

7. A brominated N-diallyl, diallyl phosphonamide having at least two bromine atoms per molecule.

8. A brominated dipropargyl phosphonamide having at least two bromine atoms per molecule.

GEORGE E. WALTER.
IRWIN HORNSTEIN.

REFERENCES CITED

The following references are of record in the file of this patent:

UNITED STATES PATENTS

| Number | Name | Date |
|---|---|---|
| 1,936,985 | Lommel et al. | Nov. 28, 1933 |
| 2,157,164 | Daly et al. | May 9, 1939 |

OTHER REFERENCES

Cavalier: "Annales de chim. et phys.," 7th series, vol. 18 (1899), pages 484–5.

King et al.: "Jour. Chem. Soc.," vol. 105 (1914), pages 1258–9.